United States Patent [19]

de Wit et al.

[11] Patent Number: 4,497,699
[45] Date of Patent: Feb. 5, 1985

[54] METHOD OF TREATING FOIL FOR ELECTROLYTIC CAPACITORS

[75] Inventors: Hendrik J. de Wit; Albertus W. M. Van Berlo; Cornelis Crevecoeur, all of Eindhoven, Netherlands

[73] Assignee: U.S. Philips Corporation, New York, N.Y.

[21] Appl. No.: 479,595

[22] Filed: Mar. 28, 1983

[30] Foreign Application Priority Data

Apr. 14, 1982 [NL] Netherlands ............... 8201558

[51] Int. Cl.³ .............. C25F 3/02; H01L 21/306; B44C 1/22
[52] U.S. Cl. ............................ 204/129.2; 204/129.4
[58] Field of Search ............... 204/129.2, 129.4, 228, 204/231

[56] References Cited

U.S. PATENT DOCUMENTS

| | | | |
|---|---|---|---|
| 2,832,734 | 4/1958 | Eckfeldt | 204/228 |
| 2,928,774 | 3/1960 | Leisey | 204/228 |
| 4,095,176 | 6/1978 | Maes et al. | 204/129.2 |
| 4,129,480 | 12/1978 | Robert | 204/228 |
| 4,343,686 | 8/1982 | Hebert, Jr. et al. | 204/129.2 |
| 4,455,200 | 6/1984 | Okamoto | 204/129.4 |

OTHER PUBLICATIONS

Meek et al., Annodic Dissolution and Selective Etching of Gallium Phosphide, J. Electrochem. Soc. (USA), vol. 119, No. 9.

*Primary Examiner*—Winston A. Douglas
*Assistant Examiner*—Terryence Chapman
*Attorney, Agent, or Firm*—Jack E. Haken; James J. Cannon, Jr.

[57] ABSTRACT

A method of treating foil for use in electrolytic capacitors in which the foil moves in one direction through a treatment liquid and in which the capacitance is measured continuously by means of at least one current-carrying electrode from which alternating current is conveyed and at least one voltage electrode at a small distance from the foil. The foil capacitance is measured by means of a phase-sensitive voltmeter. The measured capacitance is used to control the treatment method, etching or forming. In a preferred embodiment two current-carrying electrodes are present on either side of the foil and two voltage electrodes are present between the current-carrying electrodes and the foil on either side thereof. This avoids contacting of the foil.

2 Claims, 4 Drawing Figures

METHOD OF TREATING FOIL FOR ELECTROLYTIC CAPACITORS

BACKGROUND OF THE INVENTION

1. Field of the Invention

The invention relates to a method for treating foil for use in electrolytic capacitors, notably with aluminum foil, which foil is etched and then formed for use as anode and is etched but not formed for use as cathode.

The invention further relates to the resulting foil and to a device for continuously measuring the capacitance of foil moving through the treatment liquid.

2. Description of the Prior Art

In German Auslegeschrift No. 22 46 421 a measuring method and a device suitable therefor are described for the continuous measurement of the capacitance of aluminium foil during processing.

The measurement of the impedance of the foil according to the German Auslegeschrift takes place at the foil which is unwound from a reel and moves through the treatment liquid between said foil and electrodes present on either side thereof. The principle of the measuring arrangement is shown diagrammatically in FIG. 1 of the accompanying drawing. The foil is denoted by 1, the two electrodes by 2 and 3. The impedance Z is measured at 4.

For a continuous measurement of the capacitance for control during the etching process, for which there is a great need, and of the capacitance during forming at low voltage values, the device according to the German Auslegeschrift is less suitable because the measured result in that case is correct only when the capacitance of the measuring electrodes is very much larger than that of the foil.

SUMMARY OF THE INVENTION

The invention provides a method of treating foil in which both the continuous measurement of the capacitance of foils during etching and the measurement of the capacitance of foil during forming are possible and in which the measured capacitance is used to control the treatment method.

According to the invention, the method of treating foil for use in electrolyte capacitors in which said foil moving in one direction is passed through a treatment liquid and in the liquid the capacitance of the foil is measured continuously is characterized in that an alternating current is passed from at least one current-carrying electrode in the proximity of the foil in the treatment liquid and at least one voltage electrode is present at a small distance from the coil between the current-carrying electrode(s) and the foil at which electrode the voltage is measured as a measure of the required foil capacitance by means of a suitable phase-sensitive voltmeter, and that the measured capacitance is used to control the treatment method.

The characteristic feature of the measurement in the method according to the invention is that the current measurement and the voltage measurement are separated so that they cannot influence each other. Moreover, since the current is applied, the impedance between electrode and liquid does not play a role.

As a rule, the distance at which the voltage electrode is placed with respect to the foil is 1 to 2 mm.

The control of the treatment methods, for example, etching and forming, may take place by varying the rate of passage of the foil and/or by varying the etching and forming currents, respectively.

DESCRIPTION OF THE PREFERRED EMBODIMENTS

In one embodiment the alternating current is applied between the electrode and the moving foil, which means that it is superimposed upon the pickling current and forming current, respectively. The voltage is also measured between the separate voltage electrode and the foils.

In this measurement, as well as in the measurement of the above-described DE-AS, the foil has to be contacted. This is a disadvantage because then the possibility exists of varying values of the transition resistance in the contact places, which makes the measurements less accurate.

According to a preferred method in accordance with the invention the two current-carrying electrodes are present on either side of the foil and the imaginary part of the impedance $j\omega C$ is measured as a measure of the foil capacitance by means of two voltage electrodes on either side of the foil.

This embodiment does not have the above-mentioned disadvantage in that the measurement takes place without contacting the foil.

Figure 1:
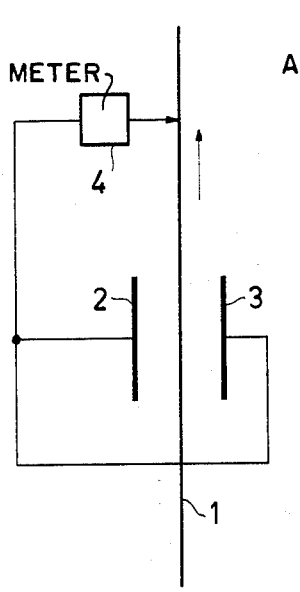
FIG. 1 shows diagramatically a prior art circuit for measurement of the impedance of foil.
Figure 2:
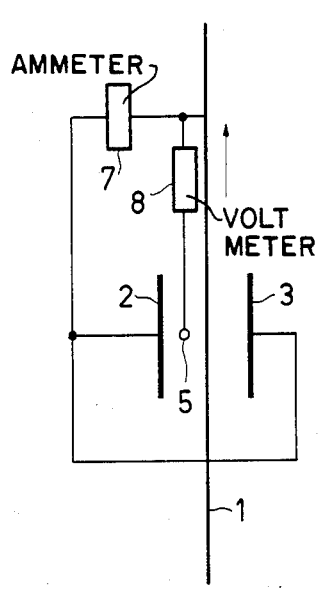
FIG. 2 shows the measuring circuit for one embodiment of the present invention.

FIG. 2 of the accompanying drawing shows the principle of the measuring arrangement according to an embodiment of the invention. Reference numerals 1 and 2 are the same as in FIG. 1. The voltage electrode is denoted as 5 and consists of a coiled platinum wire having a diameter of 0.5 mm and a length of the coil of 1.5 to 2 mm at a distance of 1 mm from the foil. The current-carrying electrode 2 consists of a platinum plate of 5 cm² area, placed at 3 cm from the foil 1. The alternating current superimposed upon the etching current is separated therefrom and measured at 7. The phase-sensitive voltmeter 8 between the electrode 5 and the moving foil 1 measures the imaginary part of the impedance $J\omega C$ which is a measure of the capacitance of the foil.

Figure 3:
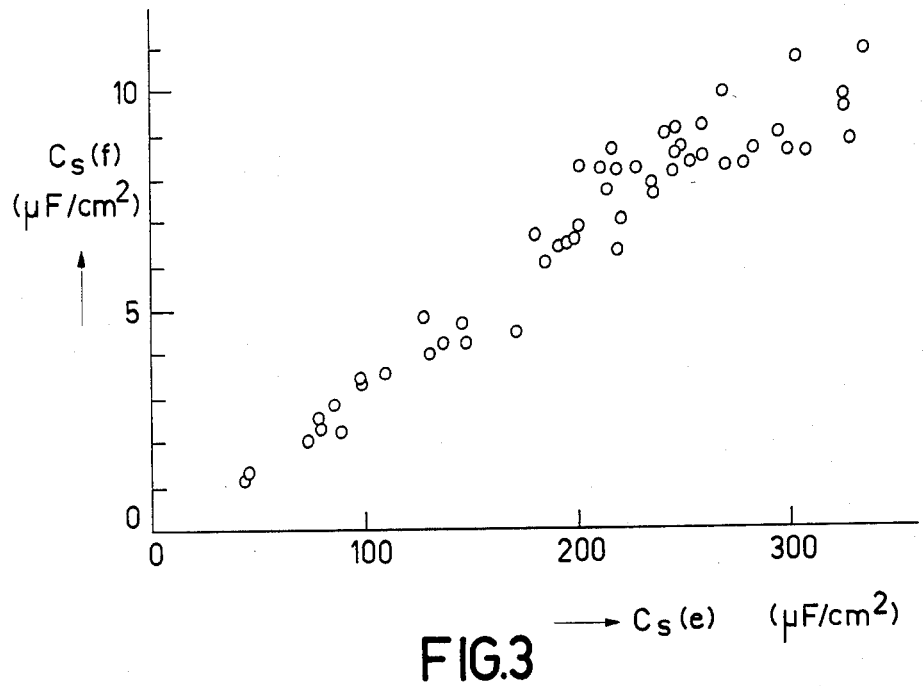
FIG. 3 shows graphically the relationship of capacitance of etched foil after forming compared to capacitance of the same foil during etching.

FIG. 3 of the drawing shows graphically the relationship between the capacitance of etched foil, after forming at 20 volts, Cs (f) as a function of the capacitance of the same foil during etching $C_s(e)$ in the device of FIG. 2.

It appears that there exists a very proper linear relationship, which illustrates a great reliability of the measurement by means of the device according to the invention.

Figure 4:
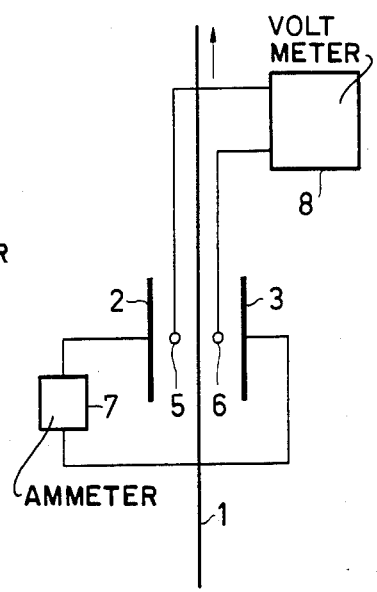
FIG. 4 shows diagrammatically the preferred embodiment for the measuring circuit of the present invention.

FIG. 4 of the accompanying drawing shows diagrammatically the principle of the measuring arrangement according to the preferred embodiment of the invention. Reference numerals 1 to 3 are the same as in FIG. 1. The two voltage electrodes are denoted as 5 and 6 and have the same shape as electrode 5 in FIG. 2 and are also present at 1 mm distance from the foil 1. The current-carrying electrodes are constructed as in FIG. 2 and are also present at a distance of 3 cm from the moving foil 1. An alternating current ammeter 7 indicates the value of the stabilized current between the electrodes 2 and 3 and a phase-sensitive voltmeter 8 indicates the voltage between the voltage electrodes 5 and 6. The supply of the current circuit and the current stabilization are not shown in this Figure. While the device is being fed with alternating voltage the imaginary component of the impedance Z is also measured at the voltmeter.

What is claimed is:

1. A method for treating foil for use in electrolytic capacitors in which said foil moving in one direction is passed through a treatment liquid and in the liquid the capacitance of the foil is measured continuously, including the steps of:

passing an alternating current from at least one current-carrying electrode immersed in the treatment liquid in the proximity of the foil in the treatment liquid; and having present at least one voltage electrode at a small distance from the foil between the current-carrying electrode(s) and the foil at which voltage electrode the voltage is measured as a measure of the required foil capacitance by means of a phase-sensitive voltmeter; and using the measured capacitance to control the treatment process.

2. A method as claimed in claim 1, further including the steps of:

having two current-carrying electrodes present, one on each side of the foil; and measuring the imaginary part or the impedance as a measure of the foil capacitance by means of two voltage electrodes.

* * * * *